(12) United States Patent
Werries et al.

(10) Patent No.: US 12,448,999 B2
(45) Date of Patent: Oct. 21, 2025

(54) JOINT COMPONENT

(71) Applicant: ZF Friedrichshafen AG, Friedrichshafen (DE)

(72) Inventors: Christoph Werries, Bissendorf (DE); Jörg Heemann, Diepholz (DE); Sören Knopp, Ostercappeln (DE); Philipp Wilhelm Kruse, Cappeln (DE); Farina Brenk, Brockum (DE)

(73) Assignee: ZF Friedshafen AG, Friedrichshafen (DE)

( * ) Notice: Subject to any disclaimer, the term of this patent is extended or adjusted under 35 U.S.C. 154(b) by 489 days.

(21) Appl. No.: 17/932,948

(22) Filed: Sep. 16, 2022

(65) Prior Publication Data

US 2023/0151847 A1     May 18, 2023

(30) Foreign Application Priority Data

Nov. 16, 2021    (DE) ...................... 10 2021 212 875.0

(51) Int. Cl.
    *F16C 11/06*         (2006.01)
    *G01B 7/30*         (2006.01)

(52) U.S. Cl.
    CPC ...... *F16C 11/0623* (2013.01); *F16C 11/0642* (2013.01); *F16C 11/0695* (2013.01); *G01B 7/30* (2013.01); *Y10T 403/20* (2015.01)

(58) Field of Classification Search
    CPC ................ B62D 15/021; B62D 15/023; F16C 11/06–086; F16C 11/106; G01B 7/30;

(Continued)

(56) References Cited

U.S. PATENT DOCUMENTS

| | | | |
|---|---|---|---|
| 7,413,201 B2 * | 8/2008 | Freytag ................ | B62D 15/023 403/27 |
| 10,119,894 B2 * | 11/2018 | Holmes ............... | F16C 11/0647 |

(Continued)

FOREIGN PATENT DOCUMENTS

| | | | | |
|---|---|---|---|---|
| DE | 20 2020 107 400 U1 | 4/2022 | | |
| WO | WO-2017215838 A1 | * | 12/2017 | .......... F16C 11/0604 |
| WO | WO-2019092209 A1 | * | 5/2019 | .......... B62D 15/023 |

OTHER PUBLICATIONS

German Patent Office, Office Action issued for German patent application No. 10 2021 212 875.0 (Jul. 23, 2022).

*Primary Examiner* — Josh Skroupa
(74) *Attorney, Agent, or Firm* — Finch & Maloney PLLC

(57) ABSTRACT

A joint component includes a ball joint with a joint housing that defines a stud opening and a measurement port opposite the stud opening in an axial direction. A ball stud includes a joint ball movably fitted in the joint housing, where the joint ball faces toward the measurement port and the ball stud extends out of the housing through the stud opening. A component body includes a joint-holding housing that defines a joint opening and has a base opposite the joint opening in the axial direction. The joint housing is inserted into the component body with its measurement port facing toward the base. An angle measurement device has an angle sensor to capture a signal that characterizes an angular position of the ball stud relative to the joint housing. The angle measurement device can hold the angle sensor in a sensor holder between the base and the joint housing.

16 Claims, 5 Drawing Sheets

(58) Field of Classification Search
CPC ......... G01B 7/305; G01B 7/31; Y10T 403/20; Y10T 403/32196; Y10T 403/32204; Y10T 403/32311; Y10T 403/32631–32811
USPC ..................... 403/27, 76, 77, 90, 122–144
See application file for complete search history.

(56) References Cited

U.S. PATENT DOCUMENTS

| | | | | |
|---|---|---|---|---|
| 11,512,979 | B2 * | 11/2022 | Sielhorst | B62D 15/023 |
| 11,788,828 | B1 * | 10/2023 | Peterson | B62D 15/023 |
| | | | | 33/203.18 |
| 11,834,118 | B2 * | 12/2023 | Tonini | F16C 11/0695 |
| 11,859,658 | B2 * | 1/2024 | Kerner | F16C 11/0609 |
| 12,097,744 | B2 * | 9/2024 | Lahrmann | F16C 11/0642 |
| 12,138,981 | B2 * | 11/2024 | Werries | F16C 11/0647 |
| 12,215,737 | B2 * | 2/2025 | Berger | F16C 11/06 |
| 2008/0199247 | A1 * | 8/2008 | Spratte | F16C 11/0647 |
| | | | | 403/27 |
| 2008/0315867 | A1 * | 12/2008 | Spratte | F16C 11/0647 |
| | | | | 403/122 |
| 2011/0204881 | A1 * | 8/2011 | Spratte | F16C 11/0604 |
| | | | | 324/207.13 |
| 2021/0339799 | A1 * | 11/2021 | Tonini | B62D 15/023 |
| 2022/0194466 | A1 | 6/2022 | Tonini et al. | |
| 2023/0220871 | A1 * | 7/2023 | Berger | F16C 11/069 |
| | | | | 403/135 |

\* cited by examiner

JOINT COMPONENT

RELATED APPLICATIONS

This application claims the benefit of and right of priority under 35 U.S.C. § 119 to German Patent Application no. 10 2021 212 875.0, filed on 16 Nov. 2021, the contents of which are incorporated herein by reference in its entirety

FIELD OF THE DISCLOSURE

The invention relates to a joint component with a ball joint, which comprises a joint housing having a joint stud opening and a measurement port opposite the stud opening in an axial direction, and a ball stud comprising a joint ball, which is fitted movably in the joint housing with its joint ball facing toward the measurement port and which extends out of the housing through the stud opening, having also a component body which comprises a joint-holding housing with a joint opening and with a base opposite the joint opening in the axial direction, into which joint-holding housing the joint housing is inserted with its measurement port facing toward the base, and having also an angle measuring device comprising an angle sensor by means of which a signal can be captured, which signal characterizes an angular position of the ball stud relative to the joint housing.

SUMMARY

The angle sensor is often integrated in the joint housing, for example in the sector of passenger cars. Such integration, however, is difficult when the joint housing has to be screwed into the joint-holding housing.

Starting from there, the purpose of the present invention is in particular, with a joint component of the type mentioned to begin with, to be able to fit the angle sensor itself when the joint housing has to be screwed into the joint-holding housing.

According to the invention this objective is achieved by a joint component as variously disclosed herein. Preferred further developments of the invention are discussed in the description given below.

A joint component with
  a ball joint which comprises a joint housing having a joint stud opening and a measurement port Opposite the stud opening in an axial direction, and a ball stud comprising a joint ball, which is fitted movably into the joint housing with its joint ball facing toward the measurement port and which extends out of the housing through the stud opening,
  a component body which comprises a joint-holding housing having a joint opening and a base opposite the joint opening in the axial direction, into which the joint housing with its measurement port is inserted with its measurement port facing toward the base, and
  an angle measuring device which comprises an angle sensor by means of which a signal can be captured, which signal characterizes an angular position of the ball stud relative to the joint housing, is according to the invention developed further in particular in that
  the angle measuring device comprises a sensor holder arranged between the base and the joint housing, by which holder the angle sensor is or will be held.

With the help of the said sensor holder it is possible to position, and if necessary connect to, the angle sensor in the joint-holding housing, without having to fasten it onto the joint housing before the joint housing is inserted into the joint-holding housing.

Preferably, the sensor holder is arranged in the axial direction between the base and the joint housing. Preferably, the sensor holder is inserted into the joint-holding housing. Advantageously, the sensor holder is arranged in the area of the measurement port. In particular, the angle sensor is held by the sensor holder in the area of the measurement port.

The ball stud with its joint ball is fitted into the joint housing so that it can rotate and/or swivel. Thus, the feature that the ball stud with its joint ball is fitted 'movably' in the joint housing with its joint ball facing toward the measurement port can accordingly and in particular be amplified, by saying that the ball stud is fitted into the joint housing with its joint ball facing toward the measurement port in such manner that it can rotate and/or swivel.

Preferably, the ball joint and/or the joint housing and/or the ball stud extend(s) in particular in the axial direction through the joint opening out of the joint-holding housing. Preferably, the ball stud is arranged with, or at least with its end facing away from the joint ball outside the joint-holding housing.

Associated with the ball joint there is preferably a joint axis that extends in the axial direction. Preferably the joint axis, or a joint axis, extends in the axial direction centrally through the ball joint and/or through the joint housing and/or through the stud opening and/or through the measurement port. Advantageously, the joint axis extends through a ball mid-point of the joint ball. A direction, or any direction extending transversely to the axial direction and/or transversely to the joint axis is in particular called a radial direction. A direction extending around the joint axis is preferably called a circumferential direction.

Preferably, a stud axis is associated with the ball stud. Preferably the stud axis, or a stud axis, extends centrally through the ball stud. Advantageously, the ball stud has a stud section which extends away from the joint ball in the direction, or in a direction of a stud axis. Preferably, the ball stud and/or the joint ball and/or the stud section is rotationally symmetrical or essentially rotationally symmetrical relative to the stud axis or a stud axis. Preferably, the stud axis extends through the ball mid-point or a ball mid-point of the joint ball. Advantageously, the joint ball is preferably provided at a free end of the ball stud. Preferably, the ball stud is arranged with its stud section outside the joint-holding housing.

A rotation of the ball stud about the stud axis is in particular characterized by an angle relative to a reference rotation position of the ball stud. This angle is denoted, for example, as the rotation angle. A tilt of the ball stud is in particular characterized by an angle enclosed between the joint axis and the stud axis. This angle is denoted, for example, as the tilt angle. A reference position of the ball stud relative to the tilt is, for example, defined by the fact that the stud axis coincides with the joint axis. That reference position is called, for example, the reference tilt position. In this case the angle enclosed between the stud axis and the joint axis is equal to zero. A tilting of the ball stud preferably takes place due to or as the result of a rotation of the ball stud about an axis passing through the mid-point of the joint ball which is inclined and/or perpendicular relative to the stud axis and/or the joint axis. Such an axis is for example also called the tilt axis. Preferably two tilt axes are defined, which are perpendicular both to one another and to the stud axis.

The angular position of the ball stud that can be determined by means of the angle sensor, relative to the joint housing, is characterized by a tilting of the ball stud and/or a rotation of the ball stud, about the stud axis. The tilting takes place for example about the tilt axis or at least one of the tilt axes. Preferably, an angular position of the ball stud and/or the tilting, or a tilting, of the ball stud and/or the rotation, or a rotation, of the ball stud, in particular, relative to the joint housing, can be determined by means of the angle measurement device. Preferably, by means of the angle measurement device, a signal can be generated that characterizes the angular position of the ball stud and/or the tilting, or a tilting, of the ball stud and/or the rotation, or a rotation, of the ball stud relative to the joint housing, According to a further development, the joint housing is fitted in or screwed into the joint-holding housing. Preferably, for that purpose the joint housing is provided with an external thread and the joint-holding housing is provided with an internal thread. In particular, the joint housing is fitted into the joint-holding housing by screwing or screwing it in.

Preferably, the sensor holder and/or the angle sensor is positionally fixed relative to the joint housing and/or relative to the joint-holding housing and/or relative to the component body.

In an embodiment, the sensor holder fits into the measurement port with a preferably cylindrical, axial end section formed on its side facing toward the joint housing. In that way the measurement port is and/or can be closed by the said axial end section, for example to prevent the penetration of foreign matter into the ball joint through the measurement port. Advantageously, in particular, on its side facing toward the joint housing, the sensor holder has a projection that forms the axial end section. Preferably, on its side facing toward the joint housing, the sensor holder has an annular contact surface that advantageously surrounds the axial end section or projection and/or its root, with which contact surface the sensor holder rests and/or is supported axially against the joint housing, preferably against an annular contact area of the joint housing that surrounds the measurement port. The root of the axial end section or projection is understood to be an axial end of the axial end section facing toward the joint housing and opposite the free axial end of the axial end section or projection. Preferably, the axial end section or projection extends from the said contact surface in the axial direction toward the joint housing, In a further development, the axial end section or projection is sealed by a sealing element or sealing ring that preferably extends around the joint axis, relative to a preferably cylindrical wall or edge of the joint housing that delimits the measurement port and in particular extends around the joint axis. In that way, any penetration of foreign matter into the ball joint through the measurement port can be even more effectively prevented. Preferably, at its outer circumference the axial end section or projection has a groove or annular groove that preferably extends around the joint axis, into which the sealing element or sealing ring, for example an O-ring can be fitted.

According to an embodiment, a recess is provided in the base, preferably on its side facing toward the sensor holder, in which the sensor holder is preferably seated. In that way the sensor holder can be and/or is in particular fixed or centered in the radial direction in the base. Preferably, the recess is rotationally symmetrical or substantially rotationally symmetrical, in particular relative to the joint axis. For example, the recess is cylindrical. Preferably, the joint axis extends centrally through the recess.

In a further development, between the base and the sensor holder there is arranged a spring or a spring element by means of which the sensor holder is prestressed, preferably axially, in the direction toward the joint housing. In that way, for example, play-free contact and/or support of the sensor holder against the joint housing and/or against a ball socket provided in the joint housing can be ensured. Preferably, the spring or spring element is arranged in the recess. For example, the spring or spring element comprises one or at least one cup spring or spring disk.

In an embodiment the sensor holder is fixed onto the base. In that way, for example, a rotation of the sensor holder relative to the joint-holding housing can be avoided. Preferably, in the base one or more axial, though-going holes are made, through and/or in which a fixing means extends, by means of which means the sensor holder is fixed to the base. Each fixing means consists, for example, of a screw.

Preferably, the joint-holding housing is provided with a wall which, in particular, extends around the joint axis and/or the joint housing in the circumferential direction.

According to a first alternative, the base is, for example, formed integrally and/or in one piece and/or monolithically with the joint-holding housing and/or with the wall of the joint-holding housing and/or with the component body. Thus, the joint-holding housing and/or its inside space can, for example, be well protected against damage by outside influences.

According to a second alternative, the joint-holding housing is, for example, provided with an opening in the base opposite to the joint opening in the axial direction, which opening is closed by the base which, in particular, forms a separate component. Preferably the base is connected permanently to the wall and/or to the joint-holding housing and/or to the body component. Thus, for example, the base can be made lighter in weight, particularly if there is little or no risk of damage due to external influences. For example, the base can consist of sheet metal.

In a further development, the angle sensor is and/or can be connected with an electric lead which preferably extends at least in part outside the joint-holding housing. Preferably, the angle sensor and the electric lead is and/or can be connected to one another by way of a plug-in connection. Preferably, the said plug-in connection comprises a plug-in contact on the sensor side and a plug-in contact on the electric lead side. In particular, these plug-in contacts are and/or can be inserted one into the other, preferably to form an electrical connection between the angle sensor and the electric lead. Thus, for example, it is possible to connect the angle sensor, in particular detachably, to an instrument arranged outside the joint-holding housing. The plug-in contact on the sensor side is and/or can preferably be electrically connected to the angle sensor. The plug-in contact on the electric lead side is and/or can preferably be electrically connected to the electric lead. Preferably, the plug-in contact on the sensor side is arranged, in particular at least partially, on or in the sensor holder. Advantageously, the electric lead is an electric cable. In particular, the angle sensor is integrated in the plug-in contact on the sensor side.

The sensor holder and/or the plug-in contact on the sensor side are preferably connected to one another by a plug-in connection, in particular a different and/or a mechanical plug-in connection. This plug-in connection preferably comprises a plug-in contact area provided on the sensor holder and a plug-in contact area provided on the plug-in contact on the sensor side. In particular, the sensor holder and the plug-in contact on the sensor side, with their plug contact areas, are and/or can be plugged one into the other, preferably to form a mechanical connection between the sensor holder and the plug-in contact on the sensor side. Preferably, the plug-in contact on the sensor side is, in particular consequently, in the form of an adapter. Advantageously the angle sensor is integrated in the plug-in contact on the sensor side. Alternatively, the angle sensor is provided, for example, outside the plug-in contact on the sensor side, in the sensor holder. In that case, the angle senor is and/or can preferably also be electrically connected to the plug-in contact on the sensor side by the said other and/or mechanical plug connection.

According to an embodiment, a through-going connection opening preferably is provided in the base and/or in the joint-holding housing. Preferably, through this connection opening access is possible, preferably from the outside, to the sensor holder and/or the angle sensor and/or the plug-in connector on the sensor side and/or the plug-in connector on the electric lead side and/or the in particular electrical plug-in connection and/or in particular the other or mechanical plug connection. Advantageously, the connection opening is and/or can be closed by a cover and/or by the plug-in contact on the sensor side and/or by the plug-in contact on the electric lead side. Preferably, particularly in this case, the cover and/or the plug-in contact on the sensor side and/or the plug-in contact on the lead side is/are sealed relative to the base and/or relative to the joint-holding housing and/or relative to the component body.

In a further development, the ball joint comprises the ball socket, or a ball socket, which is arranged in the joint housing and preferably surrounds the joint ball at least partially, on or in which the joint ball is in contact and/or inserted, in particular in such manner that it can slide. By virtue of the ball socket, for example the friction, such as the static friction and/or the sliding friction of the joint ball can be reduced and/or modified. The ball socket consists in particular of plastic. Preferably, the sensor holder is pressed against the joint housing and/or against the ball socket by the spring or spring element, particularly in the axial direction.

In an embodiment, the angle measurement device comprises a signal source provided on the joint ball, in particular an emitter element, from or by means of which in particular the signal is or can be generated. Preferably the signal source, in particular the emitter element, is positionally fixed relative to the joint ball. Preferably, the signal source or emitter element is, in particular, connected to the joint ball in a fixed and/or solid manner.

The signal is, for example, in the form of an electromagnetic field. For example, the signal is an optical signal. Advantageously, in that case the angle sensor comprises at least one electromagnetic or optical sensor. Alternatively, the signal is, for example, in the form of an electric field or an electric field strength of an electric field. In that case, the angle sensor comprises at least one sensor sensitive to electric fields, such as an electric field meter.

Preferably, the signal is in the form of a magnetic field or a magnetic flux density of a magnetic field. Preferably, the angle sensor comprises at least one sensor sensitive to magnetic fields, such as a Hall sensor or a magneto-resistive sensor. Advantageously, the signal source comprises at least one magnet which is, in particular, a permanent magnet. In particular the at least one magnet produces the magnetic field, or a magnetic field. In particular, the magnetic field, or a magnetic field of the at least one magnet constitutes the signal.

The sensor holder preferably consists of a non-ferromagnetic material. In particular, the sensor holder is made of plastic. Alternatively, the sensor holder consists for example of a metal such as aluminum or brass.

The joint housing preferably consists of metal, in particular a ferrous material such as steel. Preferably the ball stud is made of metal, in particular a ferrous material such as steel. Between the joint ball and the signal source or magnet a non-ferromagnetic material is preferably provided. For example, a plastic is positioned between the joint ball and the signal source or magnet.

The component body and/or the joint-holding housing preferably consists or consist of metal, in particular a ferrous material such as steel. If the base is a separate component, then the base preferably consists of sheet-metal such as steel sheet.

The joint component preferably is or forms a link component for a vehicle, in particular a motor vehicle. For example, the vehicle is a utility vehicle or a passenger car. The link is for example an axle link or a chassis link. For example the link is a longitudinal link or a transverse link or a wishbone. The component body is or forms, for example, a link body and/or is for example called a link body. The ball stud is in particular fixed to another component, which is preferably a wheel carrier. Preferably, the angle measurement device forms a height-level sensor for the vehicle, or a vehicle. By means of a height-level sensor, for example, the suspension deflection of the vehicle can be determined.

According to an embodiment, the invention relates, for example, to a design for receiving and integrating a height-level sensor into a wheel joint of a vehicle, such as a utility vehicle. In that case, in particular, a sensor holder is arranged between the base of the joint-holding housing and the joint housing. The sensor holder provides, for example, a flexible sealing option. Moreover, with the help of the sensor holder, for example, manufacturing tolerances can be compensated. The sensor holder is preferably held in position in the radial direction by the base, for example, by means of a close fit on the base. To apply a prestressing force and to compensate manufacturing tolerances, for example, a spring disk can be arranged between the sensor holder and the base. Advantageously, the sensor holder consists of a non-ferromagnetic material and is thus permeable to a magnetic field. Furthermore, a magnetic field can also get into the joint housing through the measurement port. The sensor holder preferably closes off the measurement port tightly, for example by means of an O-ring. Optionally, the sensor holder can additionally be fixed to the base by screws in such manner that a rotational fixing of the sensor holder is produced. In particular, the sensor holder is prestressed. Advantageously, all the degrees of freedom of the sensor holder are blocked after the assembly of the joint component. In addition, the sensor holder can, for example, stabilize the ball socket.

In particular, the invention also relates to a method for calibrating the angle measurement device of a joint component according to the invention, wherein in a first step the sensor holder is arranged in the area of the measurement port of the ball joint, which in particular is pre-assembled and/or not yet inserted into the joint-holding housing, and is fitted with the angle sensor, in a second step a calibration device is connected electrically to the angle sensor and the angle measurement device is calibrated with the help of the connected calibration device, which is then disconnected electrically from the angle sensor, in a third step the ball joint, in particular pre-assembled and/or not yet inserted into the joint-holding housing, is transported together with the sensor holder to some other location, in a fourth step, preferably at the said other location, the sensor holder is first inserted into the joint-holding housing and then the ball joint with its joint housing is inserted into the joint-holding housing, in a fifth step the ball stud is fixed and/or aligned on the other component, or on another component.

In particular, the steps are carried out one after another in the sequence indicated.

By virtue of the method, the angle measurement device can in particular he calibrated when the ball joint is inserted into the joint-holding housing at a location other than where the calibration took place.

Preferably, in the first step the ball joint is prepared, in particular pre-assembled and/or not yet inserted into the joint-holding housing. For example, the first step is carried out at a preassembly location. Advantageously, in or before the first step, the ball joint is preassembled, for example at the or at a preassembly location. In particular, the said other location is not the same as the preassembly location.

Preferably, the second step is carried out at a calibration location. In particular, the said other location is not the same as the calibration location. For example, the calibration location corresponds to the preassembly location. Alternatively, the calibration location is, for example, different from the preassembly location.

The fourth step and/or the fifth step is/are preferably carried out at the said other location. The other location can for example also be called the final assembly location.

Preferably, in the second step the ball joint is preassembled and/or not yet inserted into the joint-holding housing. Preferably, in or after the fifth step the angle sensor is connected electrically to a preferably electrical instrument.

Advantageously, in the second step and/or in the third step and/or in the fourth step and/or in the fifth step and/or thereafter, the sensor holder is in particular still fitted with the angle sensor.

Preferably, in the fourth step the ball joint with its joint housing, preferably with the measurement port at the front, is screwed into the joint-holding housing. In particular, that is how the ball joint with its joint housing is fitted into the joint-holding housing.

According to a further development, between the first step and the second step, preferably at the calibration location, the ball stud is aligned, and the position of the aligned ball stud is marked. Preferably, between the fourth step and the fifth step, preferably at the said other location, the ball stud is set or returned and/or moved to, and/or positioned in the marked position. The marking includes for example a mark on the joint housing side, for example provided by forming a notch on the joint housing. Preferably, the marking further includes a mark on the ball stud side, for example in the form of a cotter-pin hole or some other characteristic point provided on the ball stud.

In an embodiment, the other component to which the ball stud is fixed in the fifth step is a wheel carder.

The calibration takes place, for example, in such manner that for the ball stud, in particular different defined tilt angles are set and for each tilt angle set a measurement signal is captured from the angle sensor. On the basis of the defined tilt angles and the measurement signals captured, for example, a table can be produced which relates the tilt angles and the measurement signals to one another. Such a table is, for example, also called a Lookup Table. In addition, or alternatively, it is possible, for example, with the help of the defined tilt angle and the measurement signals, to formulate a functional relationship between the tilt angles and the measurement signals.

BRIEF DESCRIPTION OF THE FIGURES

Below, the invention is described with reference to preferred embodiments, referring also to the drawing, which shows.

DETAILED DESCRIPTION

Figure 1:
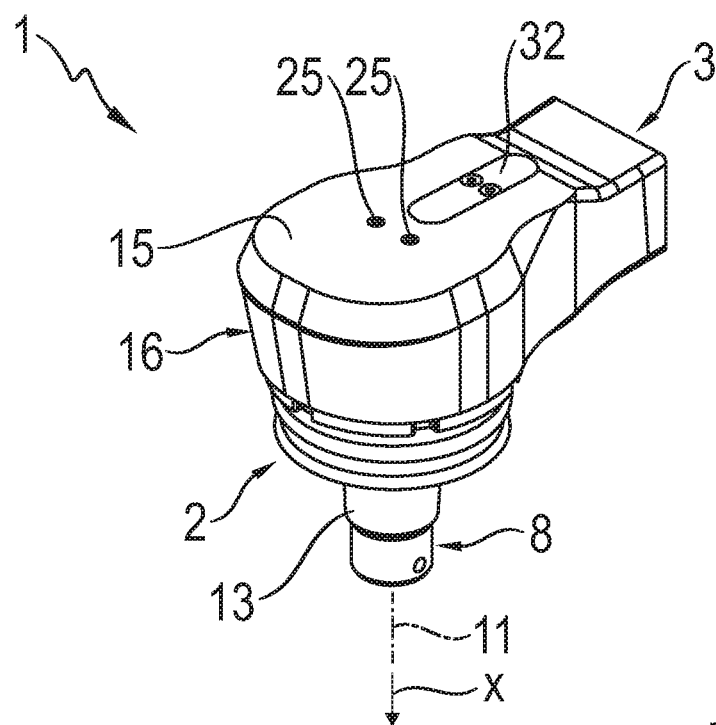
FIG. 1: A perspective representation of part of a joint component, according to a first embodiment.
Figure 2:
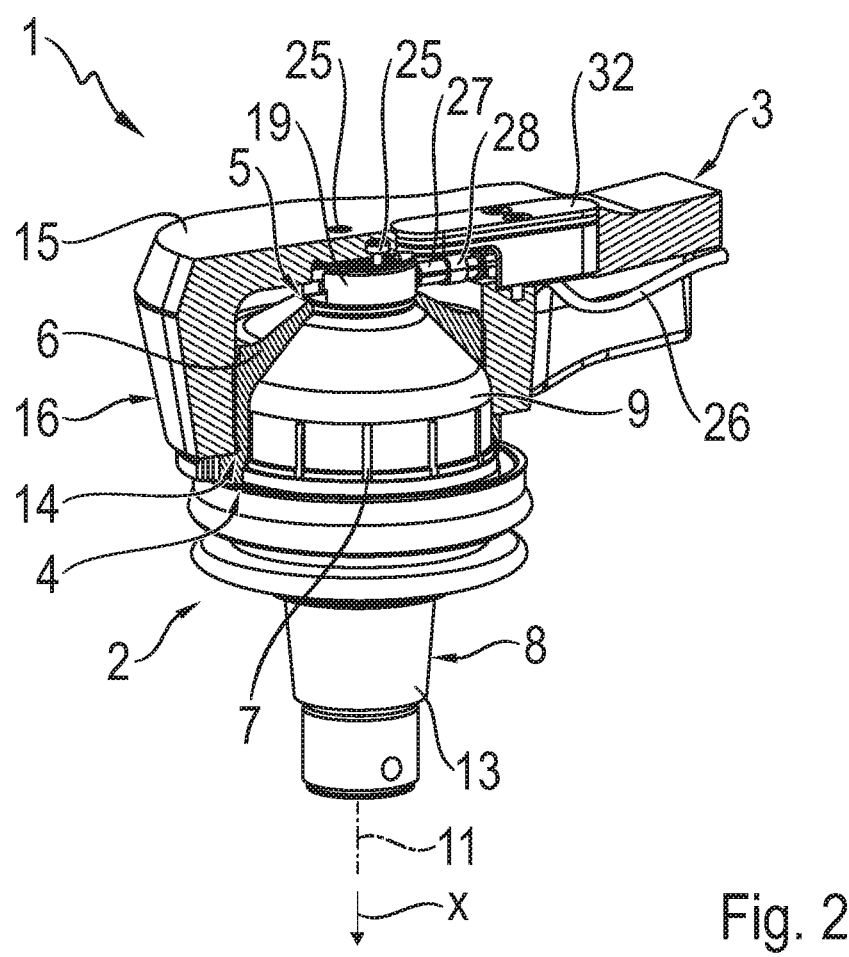
FIG. 2: A partially sectioned view of the joint component in FIG. 1.
Figure 3:
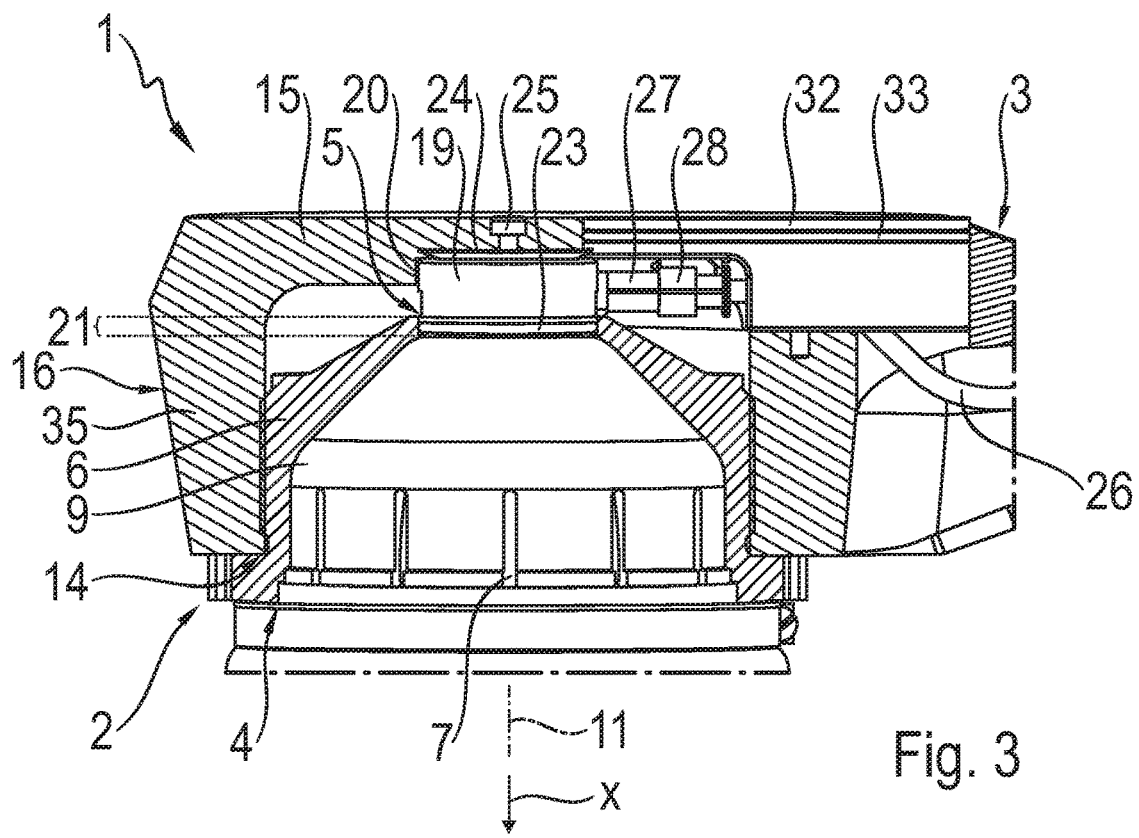
FIG. 3: Another partially sectioned view of the joint component in FIG. 1.
Figure 4:
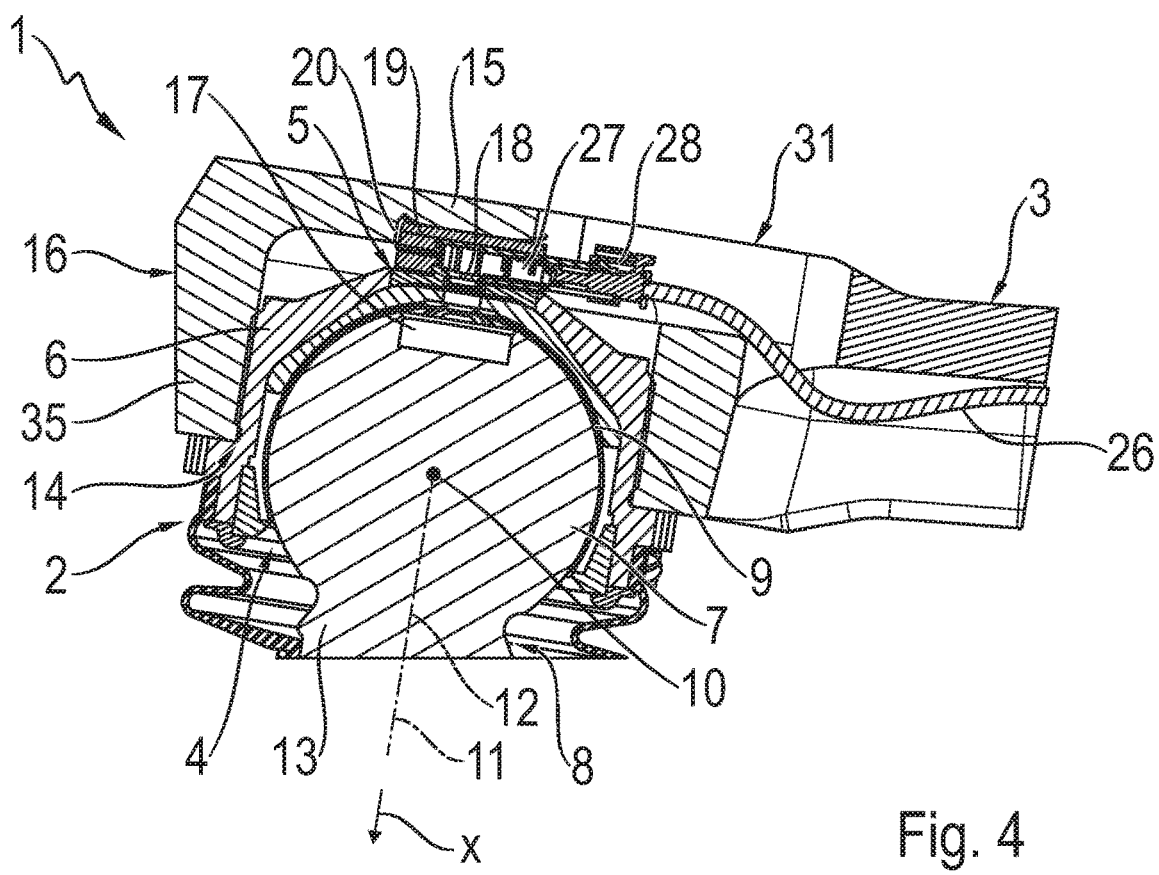
FIG. 4: A further partially sectioned view of the joint component in FIG. 1.

FIG. 1 shows a perspective view of part of a joint component 1 according to a first embodiment, whereas FIGS. 2 to 4 show partially sectioned views of this joint component 1. The joint component 1, which is in the form of a link, comprises a ball joint 2 and a component body 3, which can in this case also be called a link body.

The ball joint 2 comprises a joint housing 6 with a stud opening 4 and with a measurement port 5 opposite the stud opening 4 in an axial direction x, and a ball stud 8 comprising a joint ball 7, which is fitted movably in the joint housing 6 with its joint ball 7 facing toward the measurement port 5, the ball stud extending out through the stud opening 4. In the joint housing 6 is arranged a ball socket 9 into which the joint ball 7 is fitted so that it can slide. Associated with the ball joint 2 is a joint axis 11 which extends in the axial direction x and passes through the mid-point 10 of the joint ball 7. Furthermore, associated with the ball stud 8 is a stud axis 12 that passes through the mid-point 10 of the joint ball 7, which axis, in a reference tilt position of the ball stud 8, coincides with the joint axis 11 as shown in FIGS. 1 to 4. Thus, a tilt angle enclosed between the joint axis 11 and the stud axis 12 is equal to zero in FIGS. 1 to 4. The hall stud 8 has a stud section 13 which extends out and away from the joint ball 7 in the direction of the stud axis 12.

The component body 3 comprises a joint-holding housing 16 provided with a joint opening 14 and with a base 15 opposite the joint opening 14 in the axial direction, into which the joint housing 6 is inserted with its measurement port 5 facing the base 15. In addition, the joint-holding housing 16 comprises in particular a wall 35 that surrounds the joint housing 6. In this first embodiment the base 15 is made integrally with the joint-holding housing 16 and/or with its wall 35. The ball joint 2 extends through the joint opening 14 out of the joint-holding housing 16, so that the ball stud 8 is arranged with its stud section 13 or at least its end facing away from the joint ball 7 outside the joint-holding housing 16.

Figure 5:
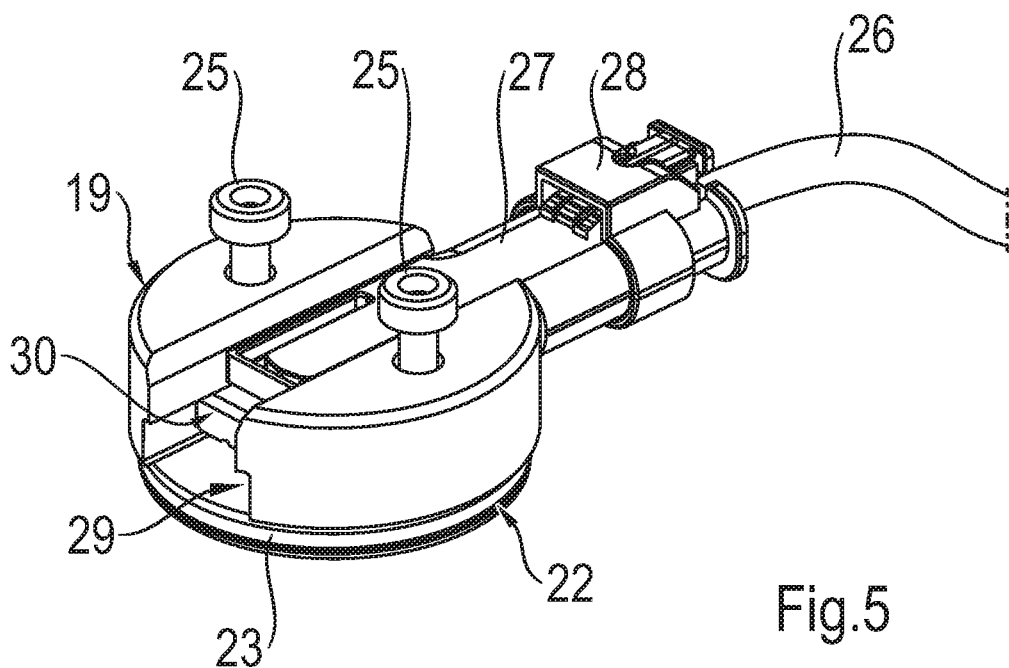
FIG. 5: A perspective view of a sensor holder.

The joint component 1 comprises an angle measurement device which has a signal source 17 provided on the joint ball 7 and an angle sensor 18, by means of which a signal produced by the signal sensor 17 can be captured. The angle sensor 18 is held by a sensor holder 19 arranged between the base 15 and the joint housing 6 in the axial direction x, which is also shown in the unassembled state in FIG. 5. The signal source 17 is positionally fixed relative to the joint ball 7 and the angle sensor 18 is positionally fixed relative to the joint housing 6, so that the signal characterizes an angular position of the ball stud 8 relative to the joint housing 6. The signal source 17 is preferably in the form of at least one permanent magnet, whose magnetic field in particular forms the signal. Moreover, the angle sensor 18 is preferably in the form of at least one magnetically sensitive sensor.

In the base 15 a recess 20 is provided, in which the sensor holder 19 is seated, this in turn sitting with an axial end section 21 in the measurement port 5. At its outer circumference the said axial end section 21 has an annular groove 22 in which a sealing element 23 is seated, by means of which the axial end section 21 is sealed relative to a. cylindrical wall of the joint housing 6 that delimits the measurement port 5. In this example embodiment the sealing element 23 is in the form of a sealing ring. In addition, between the base 15 and the sensor holder 19 there is arranged a spring 24, for example in the form of a cup spring, by means of which the sensor holder 19 is pressed in the axial direction x against the ball socket 9. Optionally, the sensor holder 19 is additionally fixed to the base 15 by screws 25 or by other fastening means, which in particular serve to prevent rotation.

The angle sensor 18 is electrically connected by a plug-in connection with an electric lead 26 in the form of a cable which extends at least partially outside the joint-holding housing 16, the plug-in connection comprising a plug-in contact 27 on the sensor side and a plug-in contact 28 on the lead side, these contacts 27 and 28 being plugged one into the other. Furthermore, the sensor holder 19 and the plug-in contact 27 on the sensor side are connected to one another by another plug-in connection which comprises a plug-in contact area 29 provided on the sensor holder 19 and a plug-in contact area 30 provided on the plug-in contact 27 on the sensor side, wherein the sensor holder 19 and the plug-in contact 27 on the sensor side are inserted one into the other with their plug-in contact areas 29 and 30. In particular, the angle sensor 18 is integrated in the plug-in contact 27 on the sensor side.

in the base 15 a connection opening 31 is provided, through which the sensor holder 19 is accessible from the outside, the connection opening 31 being closed by a cover 32 which is sealed by a seal 33 relative to the component body 3. In FIG. 4 the connection opening 31 is, for example, shown open, i.e., not closed by the cover 32.

Figure 6:
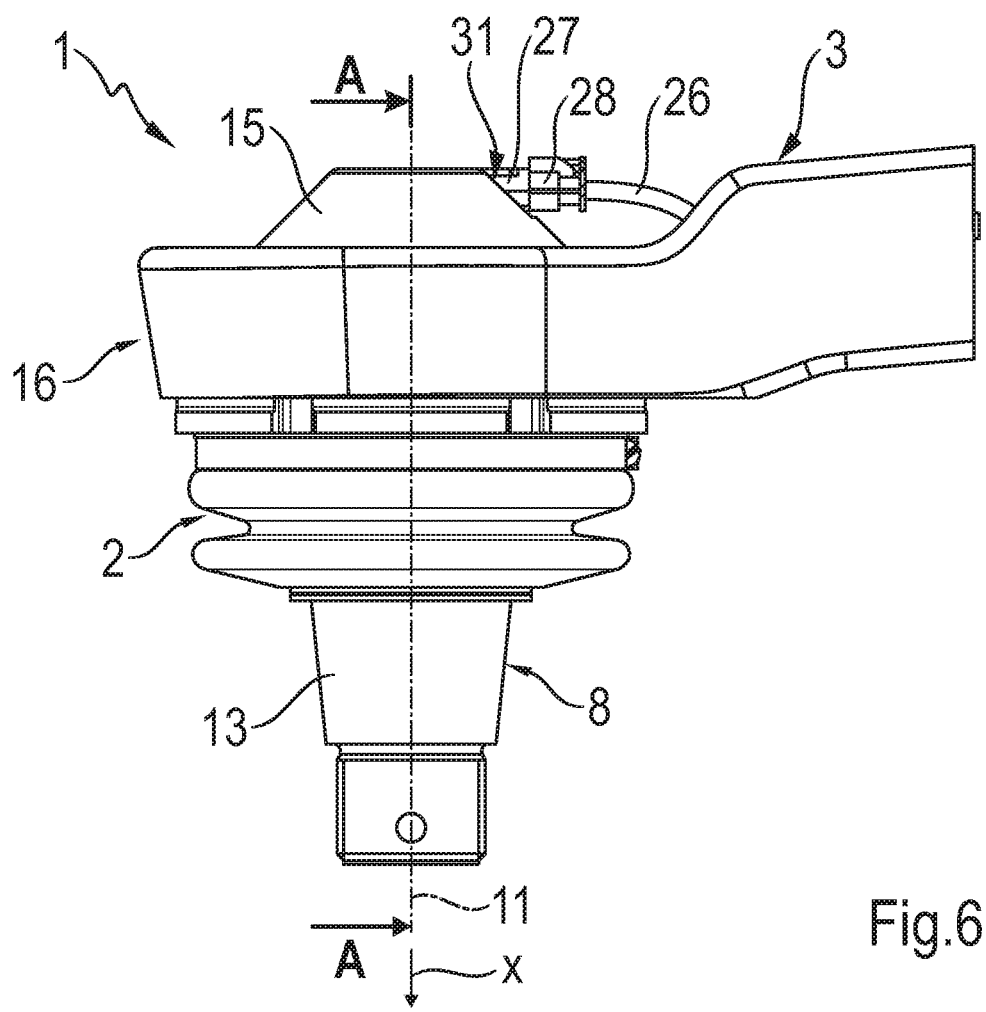
FIG. 6: A side view of part of a joint component according to a second embodiment.
Figure 7:
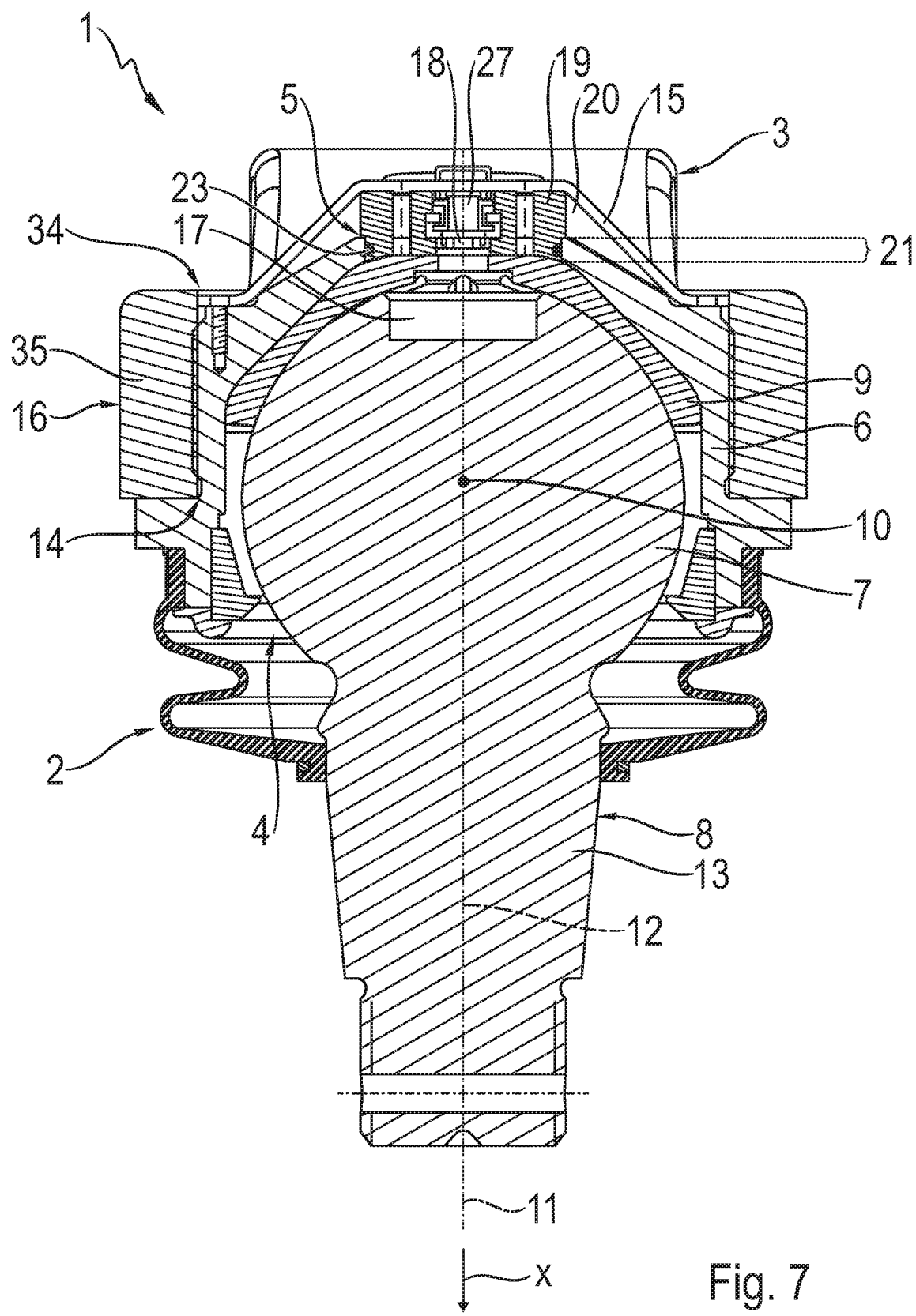
FIG. 7: A sectioned view of the joint component according to the second embodiment, along the section line A-A in FIG. 6, and FIG. 8: A flow chart to make clear a method for calibrating an angle measurement device.

FIG. 6 shows a side view of part of a joint component I according to a second embodiment, wherein features identical or similar to those in the first embodiment are denoted by the same indexes as in the first embodiment. FIG. 7 shows a sectioned view of this joint component 1 viewed along the section line A-A in FIG. 6.

The joint component according to the second embodiment differs from the joint component 1 according to the first embodiment, particularly in that the joint-holding housing 16 is provided with an opening 34 in the base opposite the joint opening 14 in the axial direction x, which opening 34 is closed by a base 15 that forms a separate component and is in particular solidly connected to the wall 35 of the joint-holding housing 16 that surrounds the joint housing 6. In particular, the base 15 consists of sheet-metal.

The recess 20 provided in the base 15, in which the sensor holder 19 is seated, is in this case formed by a truncated-cone-shaped configuration of the base 15 itself. Moreover, the connection opening 31 is in this case, in particular, not closed by a separate cover. Preferably, however, the plug-in contact 27 on the sensor side extends through the connection opening 31. Optionally, the sensor holder 19 can additionally be fixed to the base 15 by means of screws or other fastening means.

Apart from those differences the second embodiment is essentially the same as the first embodiment, so that for further descriptions of the second embodiment reference should be made to the description of the first embodiment.

Figure 8:
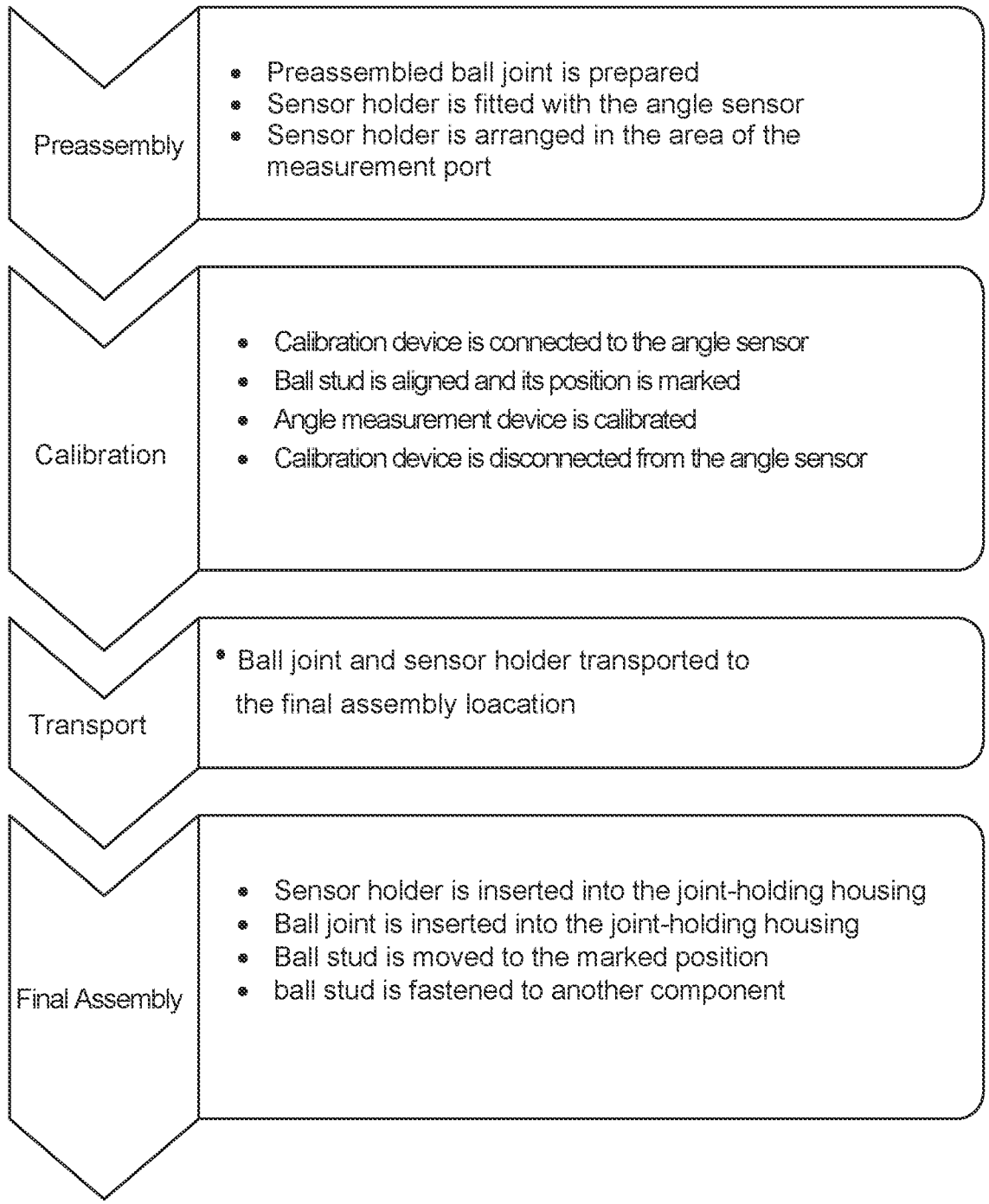

FIG. 8 shows a flow chart which makes clear a method for calibrating the angle measurement device described earlier. The method can be used both with the first and with the second embodiment.

As part of a preassembly process, the preassembled ball joint 2 is prepared. Preferably, the ball joint is preassembled in advance. In addition, the sensor holder 19 with the angle sensor 18, for example together with the plug-in contact 27 on the sensor side, are provided and arranged in the area of the measurement port 5 of the ball joint 2.

After the preassembly process, during a calibration process a calibrating device is connected electrically to the angle sensor 18, the ball stud 8 is aligned, and its position is marked, in particular on the joint housing. Then the calibration of the angle measurement device takes place with the help of the connected calibrating device, after which the latter is disconnected from the angle sensor 18.

After the calibration process, during a transportation process the ball joint 2 and the sensor holder 19 are transported to some other location, here which is also called the final assembly location.

After the transportation process, during a final assembly process, specifically at the final assembly location, the sensor holder 19 is inserted into the joint-holding housing 16, and the ball joint 2 with its joint housing 6 is then also inserted into the joint-holding housing 16. Finally, the ball stud 8 is moved to the marked position and attached to another component, which is preferably a wheel carrier.

INDEXES

1 Joint component
2 Ball joint
3 Component body
4 Stud opening in the joint housing
5 Measurement port in the joint housing
6 Joint housing
7 Joint hall of the ball stud
8 Ball stud
9 Ball socket
10 Mid-point of the joint ball
11 Joint axis
12 Stud axis
13 Stud section of the ball stud
14 Joint opening of the joint-holding housing
15 Base of the joint-holding housing
16 Joint-holding housing
17 Signal source
18 Angle sensor
19 Sensor holder
Recess in the base
21 Axial end section of the sensor holder
22 Annular groove
23 Sealing element
24 Spring
25 Screw
26 Electric lead/cable
27 Plug-in contact on the sensor side 28 Plug-in contact on the lead side
29 Plug-in connection area
30 Plug-in connection area
31 Connection opening
32 Cover
33 Seal
34 Base opening
35 Wall
x Axial direction

The invention claimed is:

1. A joint component comprising:
a ball joint having a ball socket arranged in a joint housing that defines a stud opening and defines a measurement port opposite the stud opening in an axial direction;
a ball stud comprising a joint ball, the ball stud movably fitted into the joint housing with the joint ball facing toward the measurement port, and so that the ball stud extends outward through the stud opening;
a component body having a joint-holding housing that defines a joint opening and having a base positioned opposite the joint opening in the axial direction, wherein the joint housing is inserted into the joint opening with its measurement port facing toward the base;
an angle measurement device comprising an angle sensor configured to capture a signal characterizing an angular position of the ball stud relative to the joint housing, wherein the angle measurement device further comprises a sensor holder arranged between the base and the joint housing, by which the angle sensor is held; and
a spring between the base and the sensor holder, the spring biasing the sensor holder against the joint housing and/or against the ball socket.

2. The joint component according to claim 1, wherein the joint housing is fitted or screwed into the joint-holding housing.

3. The joint component according to claim 1, wherein the sensor holder is seated in the measurement port so that an axial end section of the sensor holder faces toward the joint housing.

4. The joint component according to claim 3, wherein the axial end section is sealed relative to a wall of the joint housing that delimits the measurement port by a sealing element.

5. The joint component of claim 4, wherein the sealing component comprises a sealing ring.

6. The joint component according to claim 1, wherein the sensor holder is fixed to the base.

7. The joint component according to claim 1, wherein the base is made integrally with the joint-holding housing.

8. The joint component according to claim 1, wherein the joint-holding housing is provided with a wall that surrounds the joint housing and defines a base opening opposite the joint opening in the axial direction, the base opening closed by the base and wherein the base is a separate component that is fixedly attached to the wall.

9. The joint component according to claim 1, comprising an electric lead, a plug-in connection on or in the sensor holder, a plug-in contact on a sensor side, and a plug-in contact on a lead side, wherein the angle sensor is electrically connected to the plug-in connection via the electric lead.

10. The joint component according to claim 9, wherein the sensor holder and the plug-in contact on the sensor side are connected to one another by a second plug-in connection, the second plug-in connection having a plug-in contact area on the sensor holder and a plug-in contact area on the plug-in contact on the sensor side.

11. The joint component according to claim 9, wherein the angle sensor is integrated in the plug-in contact on the sensor side.

12. The joint component according to claim 1, wherein the joint ball is slidably retained in the ball socket.

13. The joint component according to claim 1, wherein the angle measurement device comprises a signal source on the joint ball, the signal source comprising at least one magnet defining a magnetic field that constitutes the signal, and wherein the angle sensor comprises at least one magnetic-field-sensitive sensor.

14. A method for calibrating the angle measurement device of a joint component according to claim 1, the method comprising:
providing the sensor holder with the angle sensor;
arranging the sensor holder adjacent to the measurement port of the ball joint;
electrically connecting a calibration device to the angle sensor;
calibrating the angle measurement device using calibration device and then disconnecting the calibration device from the angle sensor;
moving the ball joint together with the sensor holder to a location different from the measurement port;
inserting the sensor holder into the joint-holding housing and then inserting the ball joint with the joint housing into the joint-holding housing; and
aligning the ball stud with and/or attaching the ball stud to another component.

15. The method according to claim 14, wherein inserting the ball joint into the joint-holding housing includes screwing the ball joint with its joint housing into the joint-holding housing.

16. The method according to claim 15, wherein between arranging the sensor holder and calibrating the angle measurement device, the method includes aligning the ball stud and marking a marked position of the aligned ball stud, and wherein between inserting the sensor holder and the step of aligning the ball stud with and/or attaching the ball stud, the ball stud is moved to the marked position.

* * * * *